3,066,462
DEMISTING GAS WITH MATS
Jan K. Yap, Amsterdam, and Jacobus J. van Rossum, The Hague, Netherlands, assignors to Shell Oil Company, a corporation of Delaware
Filed Feb. 5, 1960, Ser. No. 7,022
Claims priority, application Netherlands Feb. 9, 1959
11 Claims. (Cl. 55—97)

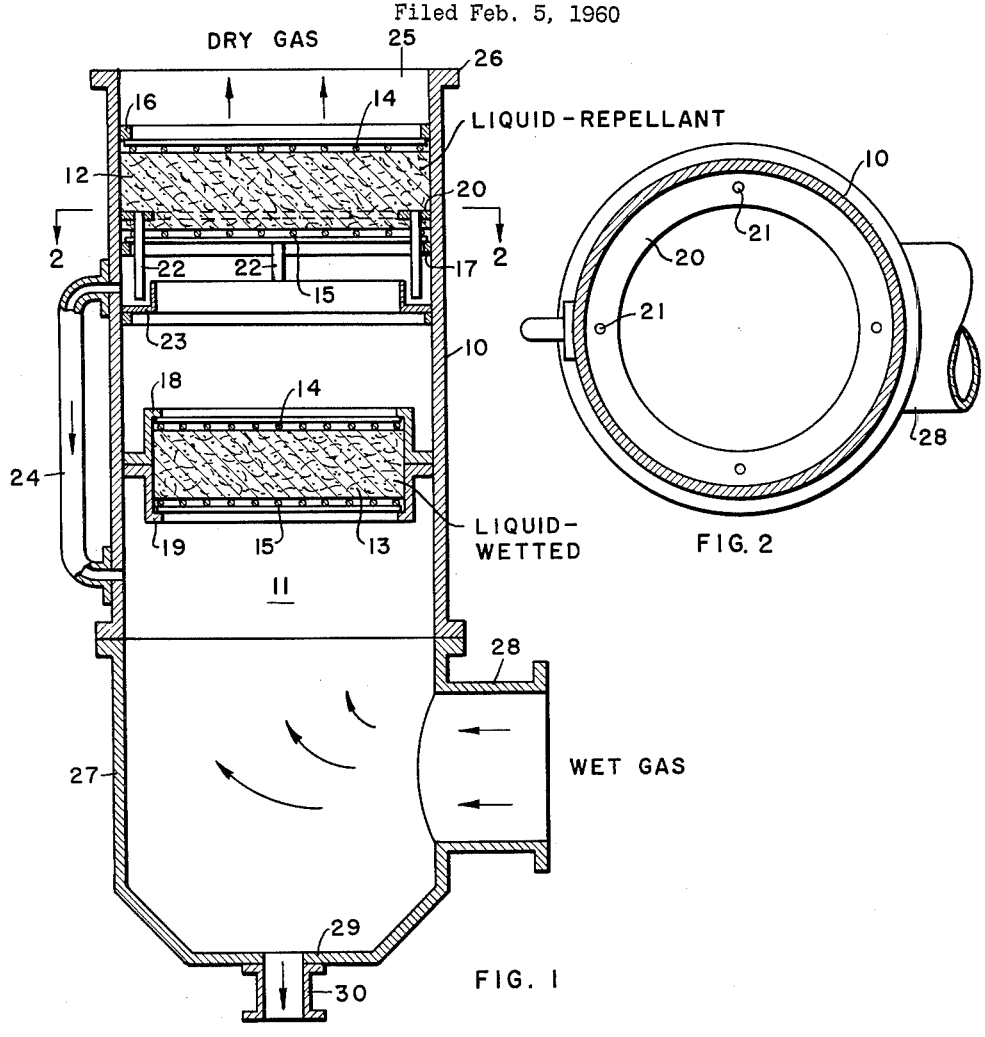
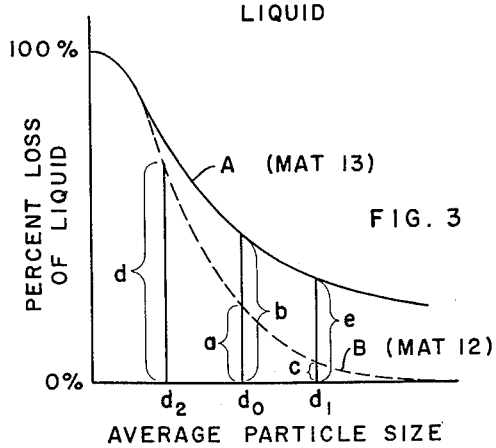
Dec. 4, 1962   J. K. YAP ET AL   3,066,462
DEMISTING GAS WITH MATS
Filed Feb. 5, 1960
INVENTORS:
JAN K. YAP
JACOBUS J. VAN ROSSUM
BY: Oswald H. Milmore
THEIR ATTORNEY

United States Patent Office 3,066,462
Patented Dec. 4, 1962

This invention relates to a method and apparatus for collecting and separating liquid drops, such as oil or water, from a gas stream in which they are entrained, by passing the gas through a series of collecting mats. More particularly, the invention is concerned with demisting gas by flowing it through a duct having mounted across the flow passage thereof a series of impingement filter mats through which the gas flows in succession.

Apparatus of this general type is known, for example, from U.S. Patent No. 2,490,959. In such devices the gas, initially laden with a certain amount of liquid, flows through a series of collecting mats, usually consisting of fibrous, woven or braided metal, glass or resin wires or strands. The mats separate the entrained liquid from the gas and the separated liquid drains off into the gas-flow duct or into a separate drain pipe. During operation such mats should retain at least a part of the liquid inasmuch as they operate most effectively when at least a certain amount of liquid is present therein.

It is in general impossible to separate and collect all of the liquid from a gas stream by such mats because the very smallest drops are carried off by the gas which emerges from the mat; this uncollected liquid can be considered to be liquid loss as regards the objects of the present invention.

Reduction of such liquid loss is desirable from various points of view. For example, in industrial applications it is often necessary to remove liquid, such as sulfuric acid and oil, from waste gas to prevent air pollution or the formation of a visible plume. In other instances the interest is principally in the recovery of the liquid as such.

To reduce such loss of liquid a series of mats may be mounted in a series, for example, with progressively increasing fineness toward the downstream direction of gas flow, to collect increasingly finer drops. In practice, however, a limit is encountered in that, as such mats are made of finer strands, as by braiding, weaving, or knitting, it becomes far more difficult and costly to manufacture them; mats of extreme fineness must be made of matted or compressed fibers, such as glass wool. Such extremely fine mats, however, impose a high pressure drop, so that excessively high amounts of energy must be supplied to induce gas flow. It is also known that the liquid-collecting capacity of the mat can be increased by using higher gas velocities, it being observed that they function principally as impingement devices; this, however, makes drainage of the collected liquid more difficult and thereby increases the tendency toward flooding. Flooding occurs when the void spaces within the mat are at least locally filled with liquid to the downstream face, resulting in entrainment by the emerging gas of liquid which was previously separated. In general, when flooding does not occur, there is only little increase in loss of liquid on the exit side of a mat with increasing gas velocity, but as soon as flooding occurs the loss increases considerably.

It is also known to use mats which are liquid-repellant, e.g., water-repellant when aqueous droplets are dealt with. (See G. L. Fairs, "High Efficiency Fibre Filters for the Treatment of Fine Mists," Trans. of the Institution of Chemical Engineers, vol. 36, pp. 477–486, December 1958.)

It is the object of this invention to reduce the loss of liquid to the exit gas when a liquid-bearing gas is demisted by means of impingement filter mats while avoiding the above-mentioned drawbacks.

In the method according to the invention the gas, initially bearing entrained liquid drops, is passed successively through a series of spaced impingement filter mats under different conditions so that a prior mat is operated substantially at the flooding state and serves to remove only a part of the entrained liquid but causes the emerging gas to entrain liquid as drops having particle sizes larger than those of the initial gas, and the said emerging gas is stripped of most of its liquid in a subsequent mat, which is operated well below its flooding state and can function more effectively because of the larger particle size of the entrained liquid.

The above-stated conditions can be created in the mats by a variety of techniques which can be employed in combination or separately. The first of these involves the use of filter mats which have different liquid-repellencies such that a succeeding mate (e.g., the last in the series) has a greater liquid-repellency than a prior mat. The second technique is to flow the gas at a higher velocity through a prior mat than through a succeeding mat, e.g., by restricting the mat area available for gas flow through the former by a peripheral or interior obstruction or baffle or by constricting the flow duct. The third technique is to remove liquid from the succeeding mat by a suitable draw-off device while draining the prior mat to a lesser extent or not at all.

In any of these techniques the conditions prevailing in the several mats are so controlled that the succeeding mat operates below its flooding point while the prior mat is operated at its flooding point or at incipient flooding.

The liquid-repellency of the mat can be controlled by making the mats or layers thereof of different material and/or by applying different treatments thereto. For example, the prior mat may be untreated and be composed of steel wire while the succeeding mat, made of like material, may be treated with a silicone fluid, obtained by partial hydrolysis and polymerization of methylchlorosilane, consisting essentially of dimethyldichlorosilane.

The principles by which the foregoing objects are realized according to the invention may be envisaged as follows:

The collecting capacity of a given mat depends, among other factors, on the velocity at which the gas flows through the mat and on the average particle size of the liquid drops entrained in the gas.

The dependence on the velocity is related to the fact that, in the case of each mat, at velocities which exceed a certain value, the efflux to the liquid recovery or collecting point from the mat of liquid which has been collected on the wires or fibers is hindered by the gas flow, as a result of which the mat gradually fills up with liquid, until flooding occurs. Liquid particles are formed from the liquid which thus fills the mat (at least locally) at the downstream face of the flooded mat by the emerging gas; however, these new liquid drops have a greater average particle size than those originally present in the gas which entered the said mat.

Since the larger drops are more likely to be caught on the wires of a mat and only the smaller drops are carried through the mat by the gas, the larger the average particle size the greater will be the amount of liquid caught by a particular mat. If the gas stream is now first passed through a mat at such a velocity that flooding occurs therein or is imminent, the loss of liquid by re-entrainment on the exit side of this mat will admittedly be very great, but the average particle size of the liquid will have been considerably increased. This increase occurs because, for the most part, the initial small drops cannot pass as such through the body of liquid retained in the mat and largely filling its said space. Instead, most of the drops entrained by the emerging gas are newly formed from the said body of liquid. This increase in drop size makes separation of liquid in a subsequent mat easier.

Hence the most important advantage of a mat in which flooding or incipient flooding occurs is that the state of the gas dispersion is modified in the sense that the entrained liquid particles are given larger average sizes on the exit side of the mat than on the entry side thereof, so that a more favorable situation is created for the separation in the following mat. In fact, the larger the average particle size the greater will be the collecting capacity of the mat. It is only necessary to insure that flooding does not occur in the last mat of the series to keep the ultimate loss of liquid at a low value. Since the occurrence of flooding is dependent not solely upon the gas velocity but also, among other factors, on the degree to which liquid, once caught by a mat, is retained thereby and drained therefrom, the object envisaged may be attained by a suitable choice in the liquid-repellency characteristics of the mat, aided if desired by the construction of the mats to implement the above-noted second and third techniques.

The apparatus for carrying out the method may comprise a substantially vertical tube defining a gas-flow passage, means for flowing the gas, initially laden with entrained liquid drops, upwards therethrough, and a plurality of transverse impingement filter mats mounted within said tube and preferably spaced apart so as to be traversed in succession by the gas, a prior mat in the series being constructed to operate at its flood point while a succeeding mat operates below its flood point when the same total gas stream flows through both. According to the invention the said succeeding mat is constructed to have a greater liquid-repellency than the prior mat. The method may also be practiced in apparatus wherein the flow area of the said succeeding mat is greater than that of the prior mat and/or wherein the said succeeding mat is drained more than the prior mat; these features may be employed regardless of the liquid-repellencies of the mats but are especially useful in the apparatus according to the invention, wherein the mats have the stated liquid-repellencies.

For example, when the last mat of the series is made of or coated with a material having a higher liquid-repellency than the first and more than two mats are present, each succeeding mat may have a liquid repellency which is the same or greater than that of the prior mats, and the liquid repellencies may increase progressively throughout the series.

The difference in the behavior between mats of different liquid repellencies is due to the different gas velocities necessary to cause flooding in the two types of mats. In mats of high liquid-repellency flooding does not occur until the gas velocity is higher than that required to cause flooding in a mat of lower liquid-repellency, other conditions being the same. Hence, in order to attain the purpose envisaged it is only necessary to select a gas velocity between the velocities which would cause flooding in the respective mats, i.e., at least as high as the flooding velocity for the mat of lower liquid-repellency and less than that which causes flooding in the mat of higher liquid-repellency. It will be apparent that this operating range can be increased by recourse to the other two techniques in combination with the difference in liquid-repellencies.

The invention will be further described with reference to the accompanying drawing forming a part of this specification and showing one illustrative embodiment, wherein:

FIGURE 1 is a vertical sectional view through a demisting apparatus according to the invention;

FIGURE 2 is a transverse sectional view, taken on the line 2—2 of FIGURE 1, the mat being omitted; and FIGURE 3 is a graph showing the action of the mats.

The embodiment illustrated includes features for carrying out all three of the above-mentioned techniques. The apparatus includes a cylindrical column 10 which defines a vertical gas-flow passage 11 and contains a plurality of transverse impingement filter mats 12 and 13. These are retained by any suitable means which constrains all gas to pass through the mats, e.g., heavy, upper and lower large-mesh screens 14 and 15, which are secured to the column wall by rings 16—17 and 18—19, respectively. As shown, the rings 18—19 may be vertically elongated and of reduced internal diameter form an annular shroud having a reduced flow area. The cross sectional area of the mat 12 is thereby larger than that of the mat 13, to create a higher gas velocity through the mat 13. The mats may be of the same thickness and may be made, for example, by rolling about a vertical axis a band of knitted, fine steel wire web. The mats may, of course, include or consist of other contacting material retained between the screens 14 and 15, such as knitted, woven or matted layers which are vertically juxtaposed or small discrete bodies, such as Raschig rings, spirals, or the like. However constructed, the mats present a multitude of points or edges on which liquid can be collected. The composite mat has a high void volume—in excess of 70% and, usually, between 94 and 99%. Typically, each mat is between two and eight inches thick and, when formed of wire or fibers, consists of strands having diameters less than 0.05 inch, e.g., 0.001 inch; however, these dimensions are not restrictive of the invention.

The upper mat has a higher liquid-repellency than the lower one. Thus, the mat 12 may be made of steel or glass strands which are surface-coated or treated to give them liquid-repellent surfaces (one example of such a coating having been given above) or may be made of a resin which is of itself liquid-repellent. The mat 13 may be made of untreated strands, e.g., steel or glass the surfaces of which are readily wetted by liquid, or which can be treated to make them more readily wetted.

The upper mat 12 is advantageously, although optionally, provided with suitable means for draining collected liquid therefrom and by-passing the liquid around the lower mat. To this end the upper mat has embedded therein below the top surface a deflecting plate 20, which may be annular. Each of a plurality of holes 21 in the plate is fitted with a drain tube 22 the open lower end of which extends into a seal trough 23. When liquid is collected in this trough gas is prevented from entering the tubes. Liquid is removed from the trough at a level above the bottoms of the drain tubes by a pipe 24 which conducts the liquid into the passage 11 beneath the lower mat.

The top of the column forms a dry-gas outlet 25 which may be open to the atmosphere or connected by a flange 26 to a duct for the dry gas.

The column is supplied at the bottom by a wet gas or mist from any suitable source, which may include a fan or blower. Thus, the column can be mounted on a lower casing 27 having an inlet 28 which can be connected to the vapor or gas outlet of a distillation column, flashing unit, gas scrubber or the like. The bottom of the casing is formed as a sump 29 which is fitted with a liquid drawoff pipe 30. The sump and pipe would, of course, be omitted when direct return of the collected liquid to the source is feasible, as when the column 10 is mounted on top of a gas scrubber.

In operation, the initial wet gas, bearing entrained small liquid drops, enters the inlet 28 to the passage 11 and flows through the mats 13 and 12 in succession. The rate of flow is regulated so that the mat 13 is substantially at flooding condition while no flooding occurs in the mat 12. As was previously noted, the mat 13 will inherently reach the flooding state at gas velocities less than necessary to flood the mat 12 because of the relative liquid-repellency properties; this would be true even if both had the same flow area and neither were drained, and the invention, broadly considered, includes the use of such mats. However, the relative restriction of the flow passage through the lower mat increases the gas velocity and promotes earlier flooding, while the removal of liquid from the upper mat by the drain tubes 22 reduces the tendency to flood.

Some of the liquid removed in the first mat 13 rains from the lower surface and part of it falls into the sump 29 and the balance is again carried into the mat by the feed gas. Liquid not collected in the sump is carried off by the gas which emerges from the top of the mat; however the latter liquid is in the form of drops which are larger than those originally present. This action of the lower mat is due to its being operated substantially at flooding condition, in that the large body of liquid retained therein at that condition captures most of the fine droplets. The gas, together with the larger drops, next flows through the upper mat 12, which operates more effectively because large drops are inherently more readily separated and because it is below its flooding state. The deflecting plate 20 creates a calm region above the holes 21, which facilitates the draining of liquid into the tubes 22. A part of the liquid drips from the mat 12 onto the lower mat. Essentially dry gas is discharged from the outlet 25 and the collected liquid is discharged through the pipe 30.

It is desirable to locate the deflector plate 20 and the tops of the drain tubes 22 somewhat above the bottom of the mat 12 so that only the upper part thereof is drained. This promotes the retention of liquid in the lower part of this mat and improves its separating efficiency, it having been found that impingement mats are less effective if the amount of liquid retained therein is below a certain value. By thus arranging the deflector and drain tubes use is made of the favorable effect on the liquid-collecting capacity of a liquid remaining in the bottom of the mat while reducing the tendency toward flooding in the upper section.

When the pipe 24 is omitted, collected liquid from the trough 23 overflows onto the mat 13. Similarly, when the plate 20 and tubes 22 are omitted all liquid collected in the upper mat falls onto the lower mat. In both cases this liquid enters the sump by passage through the lower mat.

The action of the mats is shown in the graph of FIGURE 3, which shows as ordinates the loss of liquid to the gas emerging from any mat as a percent of the liquid entering that mat, and as abscissae the average particle size $d$ of the entrained entering liquid. The solid curve A shows the behavior of a flooded mat, such as the mat 13 which is readily wetted by the liquid, while the dashed curve B shows the behavior of a non-flooded mat, such as the mat 12 which is liquid-repellent; both curves are for gas flow at the same velocity and for non-drained mats. It is evident from these curves that for any given particle size the liquid loss is greater for the flood mat than for the non-flooded mat and that liquid loss increases with decreasing particle size.

If the average particle size of the original mist is $d_0$, then the percentage of the original liquid leaving the flooded mat is $b\%$. This liquid will have a greater average particle size, such as $d_1$, and will be carried by the gas into the liquid-repellent mat. The gas emerging from the latter will carry off liquid equal to $c\%$ of that which entered this mat. The final liquid loss is, therefore, $(b \times c)\%$ of the initial liquid.

In contrast, when two successive mats having high liquid-repellencies are used with the same gas flow rate and feed stream, neither will be flooded and the curve B will describe the actions of both. In this case the liquid loss in the first mat would be $a\%$ and the liquid lost therefrom would be in the form of smaller droplets, of average size $d_2$, inasmuch as such a mat inherently collects the larger drops preferentially. The liquid loss in the second mat is, therefore, $d\%$ and the final loss $(a \times d)\%$. This loss is greater than that in the preceding paragraph inasmuch as $(a \times d)$ is obviously greater than $(b \times c)$.

On the other hand, if two mats which are readily wetted are used in succession, both would be flooded if used with the same feed and flow rate, and the behaviors of both mats would be given by the curve A. In this instance the losses for the two mats would be $b\%$ and $e\%$, respectively, leading to a final loss of $(b \times e)\%$, which is obviously also greater than in the first example.

It should be observed that it is, of course, also possible to use, in combination with the features described above, such other known techniques as using mats which are progressively finer in the gas-flow direction, thereby still further reducing the liquid loss.

We claim as our invention:

1. The method of separating liquid drops entrained in a gas stream from the entraining gas which comprises the steps of flowing said gas, laden with initial drops, successively through a first impingement filter mat which is maintained substantially at flooding condition, discharging said gas from said first mat together with entrained liquid drops having an average particle size larger than that of said initial drops, and separating liquid from said discharged gas by flowing said discharged gas through a second impingement filter mat which is maintained at non-flooding condition, said non-flooding condition in the second mat being promoted by using as the second mat one having a greater liquid-repellency than the first mat.

2. Method according to claim 1 wherein said flooding and non-flooding conditions in said mats is promoted by draining liquid from said second mat at a level intermediate the upstream and downstream sides thereof at a rate in excess of any liquid drained from such intermediate level of the first mat.

3. Method according to claim 1 wherein said flooding and non-flooding conditions in said mats is promoted by flowing said gas through said first mat at a greater velocity than the velocity of flow through said second mat.

4. The method of separating liquid drops entrained in a gas stream from the entraining gas which comprises the steps of flowing said gas, laden with initial drops, upwards through a first impingement filter mat, separating a part of said liquid drops within said first mat, discharging said gas together with entrained drops which have an average particle size greater than that of said initial drops upwards into an empty space, thereafter flowing said gas, initially laden with said larger drops, through a second impingement filter mat having a greater liquid-repellency than the first mat, separating an additional amount of liquid within said second mat, and discharging the gas, substantially freed from liquid, from the upper face of said second mat.

5. Method as defined in claim 4 wherein the gas is passed through said mats under different flooding conditions such that the tendency toward flooding is greater in the first mat than in the second mat.

6. Method according to claim 5 wherein said gas is passed through said mat of greater liquid-repellency at a velocity lower than the velocity of gas flow through said first mat.

7. Method according to claim 5 wherein a part of the liquid collected in said second mat is discharged from an intermediate level thereof and no liquid is discharged from any intermediate level of the first mat.

8. Apparatus for removing liquid drops from a gas stream wherein they are entrained which comprises a confining wall defining a gas-flow passage, means for flowing said gas stream, initially laden with said drops, through said flow passage, and a series of impingement filter mats positioned entirely across said passage so as to be traversed successively by said gas stream, said mats having different liquid-repellencies such that a succeeding mat has a greater liquid-repellency than a prior mat of the series.

9. In combination with the apparatus according to claim 8, means for draining liquid from said succeeding mat from the interior thereof.

10. Apparatus as defined in claim 8 wherein the effective cross sectional area of said succeeding mat is greater than that of the said prior mat.

11. Apparatus for removing liquid drops from a gas stream wherein they are entrained which comprises a confining wall defining a substantially upright flow passage, means for flowing said gas stream, initially laden with said drops, upwards through said passage, and a plurality of impingement filter mats positioned in vertically spaced relation transversely across said passage and in peripherally sealed relation to said wall, said mats having different liquid-repellencies such that a higher mat has a greater liquid-repellency than a lower mat.

References Cited in the file of this patent

UNITED STATES PATENTS

| | | |
|---|---|---|
| 2,889,004 | Nutting et al. | June 2, 1959 |
| 2,934,166 | Van Rossum | Apr. 26, 1960 |
| 3,022,859 | Sexton | Feb. 27, 1962 |

OTHER REFERENCES

"High Efficiency Fibre Filters for the Treatment of Fine Mists," by G. L. Fairs, Trans, of the Institution of Chemical Engineers, vol. 36, pp. 477—486, December 1958.